United States Patent
Ambrosetti et al.

(10) Patent No.: US 12,474,088 B2
(45) Date of Patent: Nov. 18, 2025

(54) RECEIVER

(71) Applicant: Synhelion SA, Lugano (CH)

(72) Inventors: Gianluca Ambrosetti, Gintilino (CH); Philipp Good, Zürich (CH)

(73) Assignee: Synhelion SA, Lugano (CH)

( * ) Notice: Subject to any disclaimer, the term of this patent is extended or adjusted under 35 U.S.C. 154(b) by 613 days.

(21) Appl. No.: 17/786,632

(22) PCT Filed: Dec. 23, 2020

(86) PCT No.: PCT/CH2020/050013
§ 371 (c)(1),
(2) Date: Jun. 17, 2022

(87) PCT Pub. No.: WO2021/127791
PCT Pub. Date: Jul. 1, 2021

(65) Prior Publication Data
US 2023/0021446 A1    Jan. 26, 2023

(30) Foreign Application Priority Data
Dec. 26, 2019   (CH) .................................. 01704/19

(51) Int. Cl.
| | |
|---|---|
| *F24S 50/80* | (2018.01) |
| *F24S 20/20* | (2018.01) |
| *F24S 23/70* | (2018.01) |
| *F24S 40/20* | (2018.01) |
| *F24S 40/55* | (2018.01) |
| *F24S 80/50* | (2018.01) |

(52) U.S. Cl.
CPC ............... *F24S 50/80* (2018.05); *F24S 20/20* (2018.05); *F24S 23/70* (2018.05); *F24S 40/20* (2018.05); *F24S 40/55* (2018.05); *F24S 80/50* (2018.05)

(58) Field of Classification Search
CPC .. F24S 50/80; F24S 20/20; F24S 40/20; F24S 40/55; F24S 80/50
USPC ............................................................ 126/569
See application file for complete search history.

(56) References Cited

U.S. PATENT DOCUMENTS

| | | | |
|---|---|---|---|
| 4,549,528 A | 10/1985 | Gibson | |
| 4,581,897 A * | 4/1986 | Sankrithi | F24S 20/20 60/641.11 |
| 4,604,990 A | 8/1986 | Nikkel et al. | |

(Continued)

FOREIGN PATENT DOCUMENTS

| | | |
|---|---|---|
| DE | 102004026517 | 10/2005 |
| WO | 8102778 | 10/1981 |

(Continued)

OTHER PUBLICATIONS

WIPO, International Search Report mailed Feb. 25, 2021, in PCT/CH2020/050013, 6 pgs.

*Primary Examiner* — Allen R. B. Schult
*Assistant Examiner* — William C Weinert
(74) *Attorney, Agent, or Firm* — Henry Patent Law Firm PLLC (57) ABSTRACT

The invention relates to a receiver (50) having an absorber (55) and an opening (53) for the solar rays incident on the absorber (55) during operation, wherein a window (52, 60, 61, 62) is provided, which covers the opening (53), and wherein a changing assembly (51) is provided, which interacts with said window to change the window (52) covering the opening (53) for another window (60, 61, 62).

25 Claims, 7 Drawing Sheets (56) References Cited

U.S. PATENT DOCUMENTS

| | | | | |
|---|---|---|---|---|
| 5,894,838 | A | 4/1999 | Yogey | |
| 2010/0206298 | A1* | 8/2010 | Karni | F24S 20/20 |
| | | | | 60/641.15 |
| 2011/0283995 | A1* | 11/2011 | Kesseli | F24S 20/20 |
| | | | | 126/698 |
| 2012/0031094 | A1* | 2/2012 | de Bruijn | F24S 10/742 |
| | | | | 60/641.11 |
| 2014/0326235 | A1 | 11/2014 | Klein et al. | |
| 2018/0224163 | A1* | 8/2018 | Arjomandi | F24S 60/00 |
| 2019/0129129 | A1* | 5/2019 | Chen | G02B 7/021 |
| 2019/0346177 | A1* | 11/2019 | Jafarian | C01B 3/042 |
| 2022/0214078 | A1* | 7/2022 | Carrascosa Pérez | F24S 23/70 |

FOREIGN PATENT DOCUMENTS

| | | |
|---|---|---|
| WO | 2018205043 | 11/2018 |
| WO | 2019213787 | 11/2019 |
| WO | 2020206561 | 10/2020 |
| WO | 2021127791 | 7/2021 |

* cited by examiner

RECEIVER

The present invention relates to a receiver according to the preamble of claim 1. Such receivers are used in a solar power plant, in particular a solar tower power plant. They include, for example, volumetric receivers according to WO 2018/205 043, which absorb the solar radiation reflected by an array of heliostats and thereby heat up a heat-transporting fluid, the heat of which can then be used industrially, for example as process heat or for generating superheated steam for operating steam turbines connected to a generator.

Another application for the above-mentioned receivers lies in the use as a receiver-reactor for the production of synthesis gas or simply syngas in the production of liquid or gaseous hydrocarbon fuels or for the cracking of hydrocarbon gases. In particular, the cracking of methane is considered a possible technology of the future, since the reaction $CH_4 \rightarrow C+2H_2$ takes place in the absence of oxygen, i.e. no $CO_2$ emissions are released. The hydrogen produced serves as an energy carrier, while the carbon is used industrially for the manufacture of products such as carbon black, graphite, diamonds, carbon fibres, conductive plastics, or tyres.

Especially for receiver-reactors, temperature ranges above 1000° C. are required, for example up to 2000° C. or above.

The high temperatures alone place high demands on the window of such a receiver or reactor, the service life of which may be reduced by the operating temperatures. In the case of a receiver-reactor, it is possible that reaction products are deposited inside during operation, thus also on the window, which thus becomes dirty, allows less solar radiation to pass through, and thus reduces the efficiency of the receiver-reactor.

Accordingly, it is the object of the present invention to provide an improved receiver or receiver-reactor.

This object is achieved by a receiver or receiver-reactor having the characterising features of claim 1.

By providing a changing assembly for the replacement of the window, the window can be fully utilised within its specifications on the one hand, but also beyond, since it can be easily replaced, for example when its service life is shortened. Thus, in accordance with the invention, the increased demands on she window are met and the deterioration of the window is eliminated.

In addition to the stated object, the use of a thermally insulating window portion makes it possible to prevent the receiver or receiver-reactor from cooling down, as may happen, for example, during brief interruptions in operation due to cloud cover or at night.

Further preferred embodiments have the features of the dependent claims.

The invention is described in more detail below, with reference to the figures, by way of an absorptive receiver. In this context, only the term "receiver" is used for both a receiver and a receiver-reactor, since the window assembly according to the invention can in principle be used on all types of receivers, including receivers (or receiver-reactors) that are not absorptive receivers in the sense of WO 2018/205 043.

In the figures:

FIG. 1a shows schematically a solar tower power plant 1, with an array of heliostats 2, which in a known manner direct the solar rays 3 in concentrated form onto a receiver 4 having a window assembly according to the invention, which has been omitted for the sake of clarity in the figure and is in turn arranged on a tower 5.

Figure 1A:
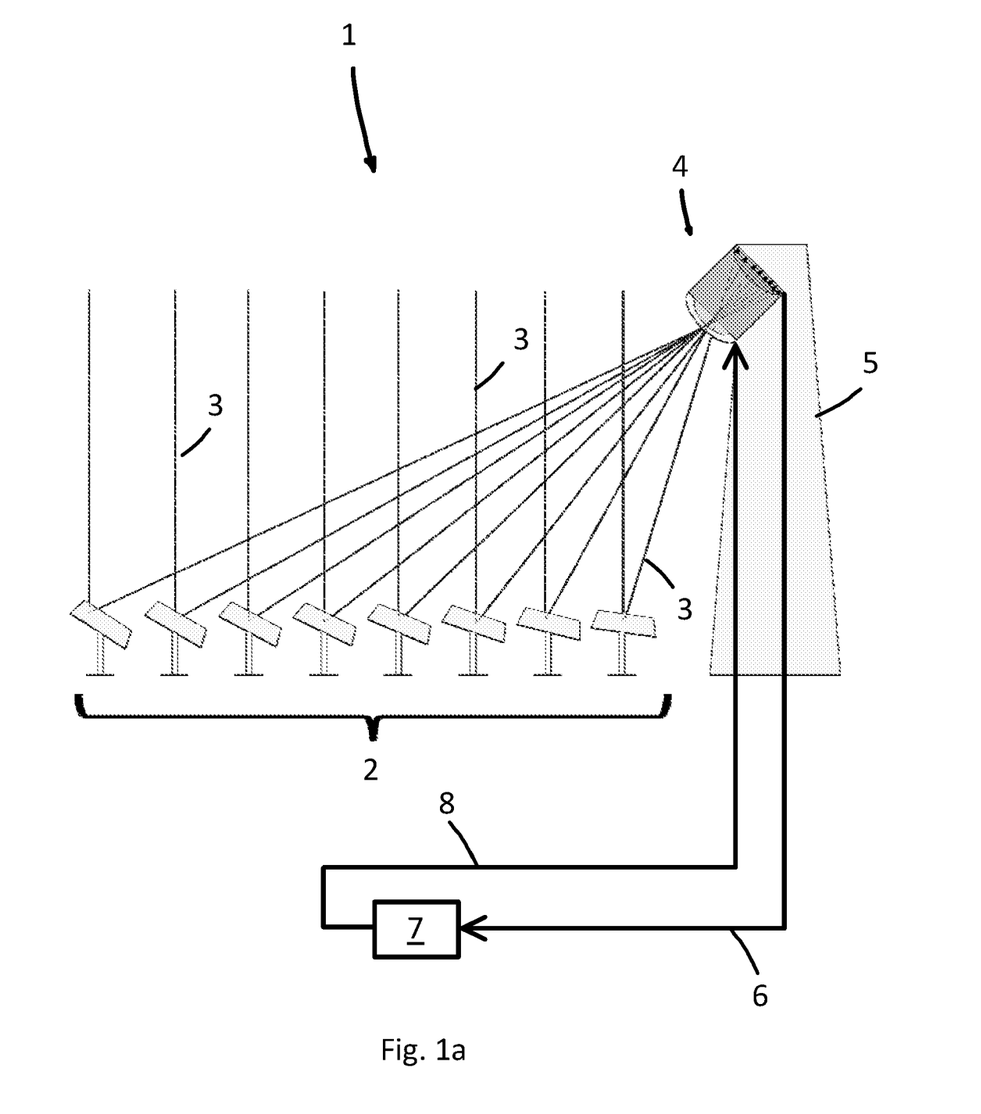
FIG. 1a shows a solar power plant according to the prior art with a receiver.

On the one hand, the receiver 4 can be used to heat up a heat-transporting fluid, wherein this (solar) heat can then be used industrially, for example to generate steam in a turbine or for industrial processes that require heat.

Preferably, but not necessarily, the receiver is designed as an absorptive receiver, in which particularly preferably the ratio X of the temperature increase $(T_3-T_2)$ due to absorption of radiation to the total temperature increase $(T_4-T_2)$ due to absorption and convection at the absorber is $\geq 0.3$ or $\geq 0.6$ or $\geq 0.8$.

Figure 1B:
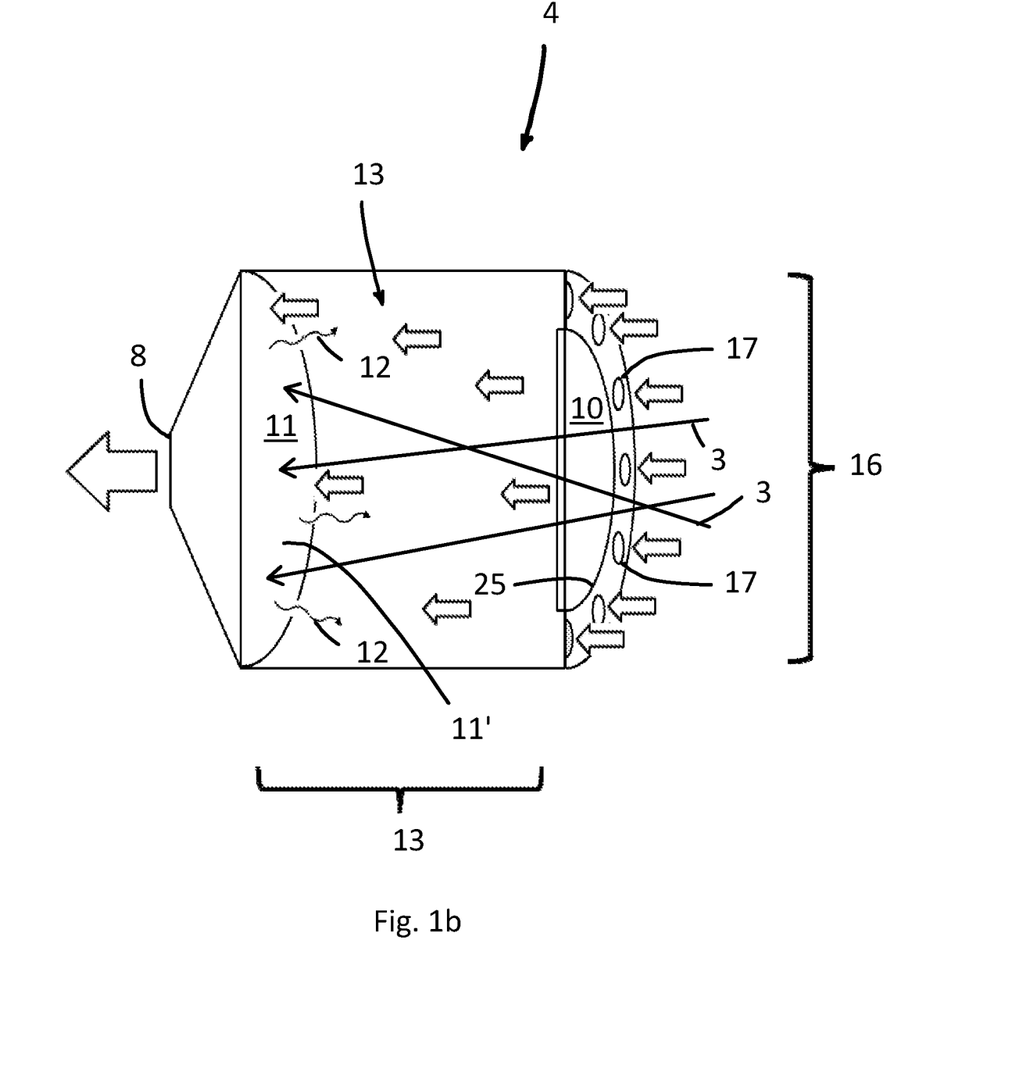
FIG. 1b shows a prior art receiver.
Figure 1C:
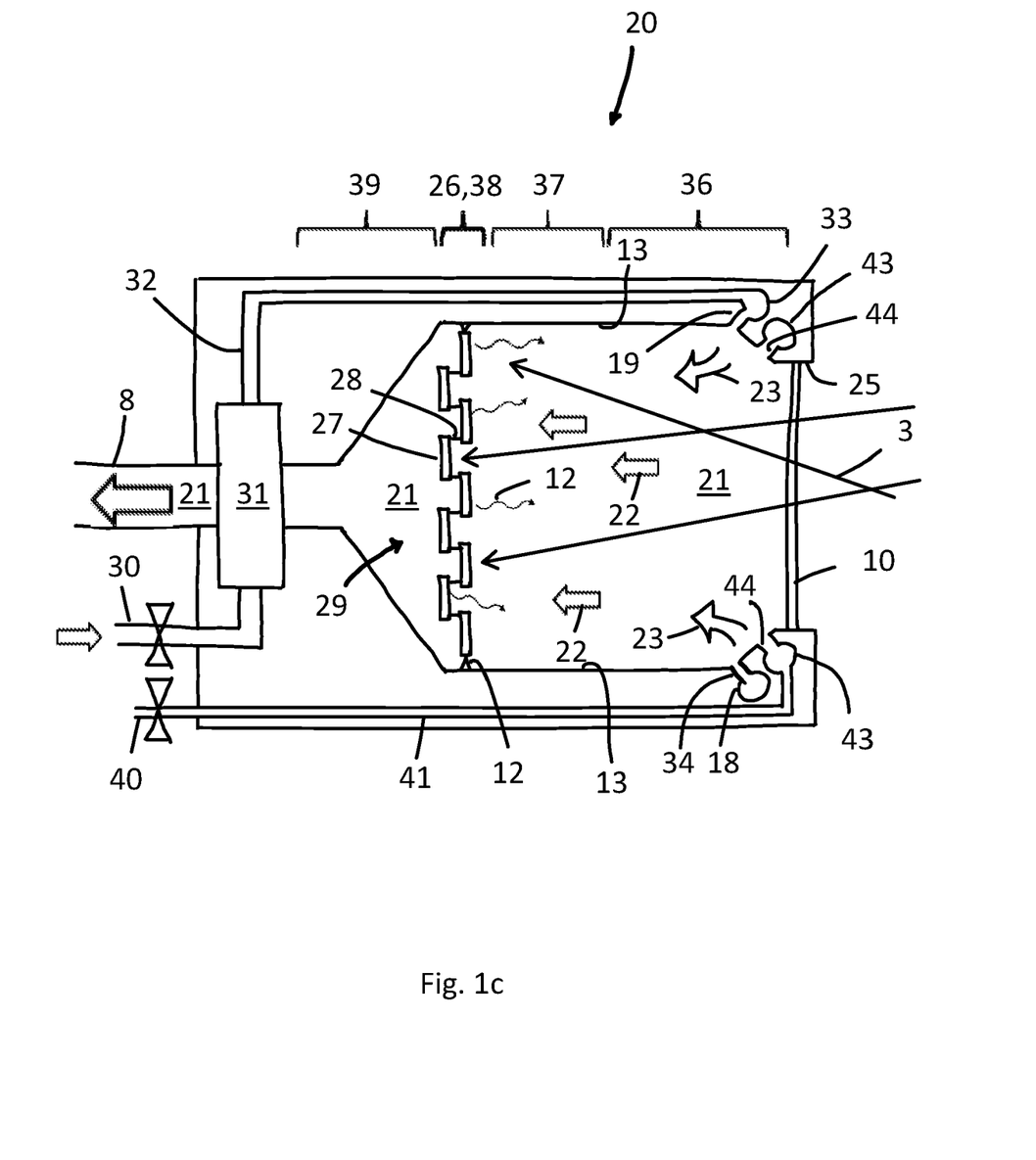
FIG. 1c shows a receiver which is designed as a receiver-reactor.

In a development of the receiver 4 according to the as yet unpublished document PCT/CH2019/050009 it is also possible to provide said receiver as a receiver-reactor for the production of, for example, syngas, or, according to the as yet unpublished document CH 1407/19, for the cracking of hydrocarbon gases, etc.; see FIG. 1c and the description thereof.

The heat that accumulates in the receiver 4, but in the case of the receiver-reactor is currently not usable or not repulsed for the chemical reaction taking place therein, can be conducted via heated, heat-transporting fluid with a (higher) temperature $T_0$ via a line 6 to a consumer 7, where it cools down and is then returned to the receiver or receiver-reactor 4 in the circuit via a line 8 with a (lower) temperature $T_{in}$.

In solar tower power plants, substantially three-dimensionally formed receivers are used that are suitable for high temperatures, such as those reached at a concentration of 500 suns, 1000 suns, or more. Such temperatures are usually above 800 K, and may reach in the region of 1000 K, 1500 K, or more in the near future, it being expected that very soon temperatures of 1800 K or 2000 K will not only be reached, but also exceeded, for example in syngas production.

FIG. 1b shows schematically the structure of an absorptive receiver 4 designed as a three-dimensional receiver for heating up heat-transporting fluid, which, as mentioned above, is described in WO 2018/205043.

Solar radiation 3 concentrated by the heliostats 2 (FIG. 1a) enters the receiver 4 through a window 10 and is incident on an absorber 11, the surface 11' of which heats up accordingly, with its temperature possibly exceeding 2000° C. depending on the intended use. The highly heated surface 11' of the absorber 11 thus radiates back against the window 10 in the infrared range; see the arrows 12 symbolising this infrared radiation. In an absorption chamber 13, however, this infrared radiation 12 is absorbed by heat-transporting fluid, which flows into the absorption chamber 15 at the inlet temperature $T_{in}$ via an inlet connection 14 (connected to the line 8, FIG. 1a), passes through this towards the absorber 11 (provided here with openings omitted for simplicity of the figure), and leaves the receiver 4 again at the outlet temperature $T_{out}$ through an outlet opening 8 (connected to the line 6, FIG. 1). As it passes through the absorption chamber 13, the heat-transporting fluid heats up absorptively to $T_{out}$, in accordance with the concept of the presented absorptive receiver 4.

If the receiver 4 is used as a receiver-reactor, the absorber 11 can be designed as a reactor element no allow a redox reaction to take place, for example for the production of syngas. Then, the absorber 11 designed as a redox reactor has a reducible and oxidisable material for a reduction process and an oxidation process, preferably $CeO_2$, which can be reduced at elevated temperature or oxidised in the presence of an oxidising gas. For example, $CO_2$ or water vapour can then be used as infrared-absorbing gas.

By cyclically increasing or decreasing the mass flow of heat-transporting gas through the absorption chamber 15, the temperature of the absorber 14 can be cyclically lowered or increased in a targeted manner so that the following redox reaction is produced:

As the temperature rises, the absorber 14 is increasingly reduced (i.e. it loses oxygen), with the degree of reduction being dependent on the temperature of the absorber 14 and the oxygen partial pressure prevailing there. The equation $CeO(2-\delta_{ox}) \rightarrow CeO(2-\delta_{red}) + (\delta_{red}-\delta_{ox})O$ applies for the reduction, since the absorber 14 does not release the oxygen stoichiometrically. The reduction could in principle take place in a vacuum, but preferably in the presence of water vapour, which prevents the back radiation of the absorber 14 through the optical opening 13 and carries the oxygen $(\delta_{red}-\delta_{ox})O$ away with it from the receiver, for example to a separation station provided in the line 6 (FIG. 1a).

As the temperature drops, the absorber 14 is increasingly oxidised (i.e. it absorbs oxygen), with the degree of oxidation in turn being dependent on the temperature of the absorber 14 and the oxygen partial pressure prevailing there. The oxygen supplier is the heat-transporting fluid, i.e. here the water vapour (the oxygen released during the reduction has been transported away from the receiver-reactor). For the oxidation, the equation $CeO(2-\delta_{red}) + (\delta_{red}-\delta_{ox})H2O \rightarrow CeO(2-\delta_{ox}) + (\delta_{red}-\delta_{ox})H_2$ applies, since the absorber 14 does not absorb the oxygen stoichiometricaliy. As a result, $H_2$, i.e. hydrogen, has been formed, which is again led away by the heat-transporting fluid to the separation station 9 (FIG. 1), is separated there, and is made available as syngas.

Here, the non-stoichiometric $\delta$ denotes the amount of oxygen lost by $CeO_2$, i.e. the particular "reduction" or "oxidation" state, which, as mentioned, depends on the oxygen partial pressure and the temperature, From the point of view of a constant redox process, a reduction state exists at a larger 3 and an oxidation state at a smaller $\delta$.

In the case of receivers such as those shown in FIG. 1b, the temperatures $T_{in}$ may be 1000° C. or higher, and therefore the window 10 cannot fall below this temperature during operation. In addition, the window is reached by infrared radiation 12, which, although minimal, cannot be completely avoided. Lastly, the window absorbs a small proportion of solar radiation 3. As a result, the window 10 has operating temperatures that are even higher than $T_{in}$, which places considerable demands on the material used and can impair its service life.

FIG. 1c shows schematically the structure of a receiver configured for the cracking of hydrocarbon gases, which in turn is designed as an absorptive receiver of the type according to WO 2018/205043.

Shown is a longitudinal section through receiver 20 according to a first embodiment with a flow channel 21 passing through it for a process gas symbolised by the arrows 22, 23, the flow channel leading from an opening 25 for the solar rays 3 closed by a window 10 to an outlet 8 from the receiver 20. The solar rays 3 are incident through the opening 25 into an absorber region 26 of the receiver 20, which absorber region is thus in the path of the incident solar radiation and is thus heated, individual absorber plates 27 are connected to each other by struts 23 and suspended in the flow channel 21, thus forming the absorber 29. The absorber plates 27 are arranged in such a way that they face the opening 25, and thus the absorber 29 is illuminated over its entire extent, during operation, by solar radiation 3 incident directly on it. Furthermore, the plates 21 are arranged offset relative to each other so that the process gas and the process products can easily flow through between the absorber plates 27—the absorber region 26 and the absorber 29 can be passed through by the flow of process gas.

In operation, a hydrocarbon gas such as methane is fed as process gas via a supply line 30 to the receiver 20, which is designed as a receiver-reactor, is preferably (but not necessarily) preheated in a heat exchanger 31, and is fed via a transport line 32 into a ring line 33 provided at the opening 25, from which it is discharged via supply channels 34 into the flow channel 21, symbolised by the arrow 23. The absorber 29 heated by the solar radiation 3 emits blackbody radiation in the infrared range, symbolised by the arrows 35. The process gas flowing in the flow channel according to the arrows 22, in this case methane, is highly transparent to the solar radiation 3, but absorbs the blackbody radiation 35 and thus heats up absorptively.

A person skilled in the art can now adjust the flow rate of the methane together with the dimensions of the flow channel 21 and the radiation intensity of the absorber 29 in such a way that the methane on its way to the absorber 29 is heated to its cracking temperature in a first region 36 of the flow channel 21, is heated above the cracking temperature in a subsequent second, downstream flow region 37, and is heated even further in a third, further downstream flow region 38 of the flow channel 21, the third flow region 38 corresponding to the absorber region 26.

In the third flow region 38, or in the absorber region 26, the methane comes into physical contact with the absorber 29 across the cross-section of the flow channel 21, the absorber acting as a reaction accelerator for the dissociation of the methane due to the physical contact, i.e. it is a reaction accelerator that also has the function of an absorber in a receiver. A possible convective heat transfer from the reaction accelerator thus formed as an absorber 29 is irrelevant for the dissociation of the methane. As a result, the methane dissociates comparatively abruptly due to the physical contact, so that in the fourth region 39, behind the absorber region 26, a stream of products is formed which contains nanoparticies of carbon and hydrogen, i.e. soot and hydrogen. This stream is discharged from the receiver-reactor 1 through the outlet 8 after heat has been extracted from it in the heat exchanger 16.

Since the formation of the carbon nanoparticies (soot) already starts in the first region 36 and slowly builds up in the second region, a portion of the nanoparticies can be deposited on the absorber 10, in this case on the absorber plates 11, and can settle on these as a soot layer. This is harmless for the continuous cracking of the freshly fed methane, since carbon or soot has the preferred properties of the absorber material: it is black, i.e. highly absorptive for the incident solar radiation 7, emits the desired (infrared) blackbody radiation after heating, and is temperature-resistant in the range up to well over 2000° C. With increasing deposition, however, the geometry of the absorber 29 also changes with regard to its flow properties, to an extent where cracking is impaired. Then the deposit must be removed appropriately by a (cyclic) maintenance step.

In the embodiment shown, this is done by introducing a second process gas into the reactor-receiver 1 by means of a second feed line 40 via the second transport line 41, leading it to a second ring line 43, and discharging it from there into the flow channel 2 via second feed channels 44, as indicated by the arrows 23. The second process gas is preferably a reducible or oxidising gas, particularly preferably water vapour, which is absorptively heated in the first 36 and second 37 regions and then chemically reacts in the absorber zone 38 with the carbon deposited on the absorber 29, according to the equation $H_2O+C \rightarrow CO+H_2$. In other words, the receiver-reactor is then also productive during the maintenance operation and produces syngas as a feedstock for synthetic fuel. In any case, hydrogen production is not interrupted, and if hydrogen is used unchanged (compared to cracking), the carbon monoxide can be used for the production of methanol or other liquid hydrocarbons, for example by means of Fischer-Tropsch synthesis.

Since, as mentioned, the formation of the carbon nanoparticies (soot) already begins in the first region 36, isolated soot particles also reach the window 10 and can accumulate over a certain operating time, in such a way that the efficiency of the receiver 20 is impaired and the window itself is heated considerably above its operating temperature by the absorption of the radiation 3 at the soot particles.

Figure 2:
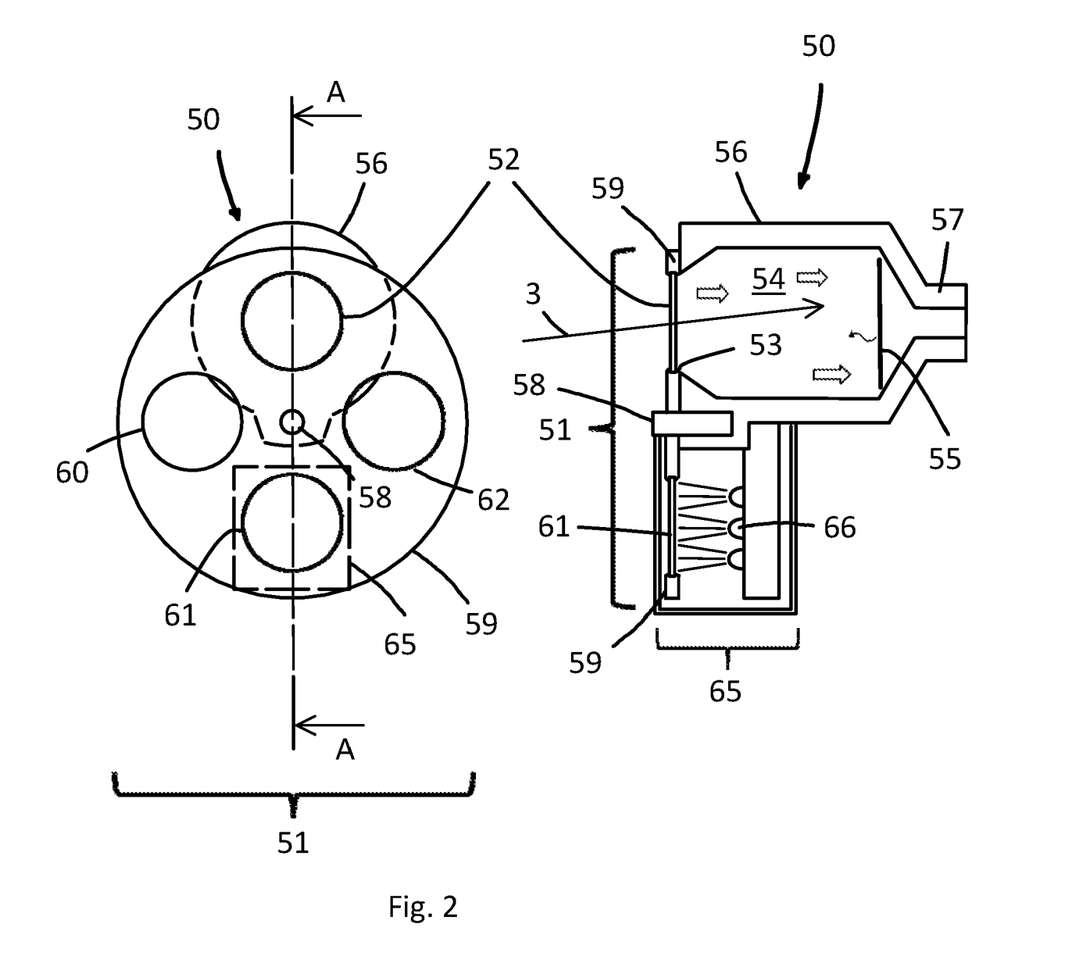
FIG. 2 shows a first embodiment of a window assembly according to the invention.

FIG. 2 shows on the left side a receiver 50 with a changing assembly 51 according to the invention in a view of a window 52 illuminated by the sun, a sectional plane AA being drawn in this view.

On the right-hand side of the figure, the receiver 50 is shown in a section along the plane AA, said receiver being designed here as an absorptive receiver according to the concept shown in FIG. 1b or 1c. Accordingly, the details of the receiver 50 itself are omitted to simplify the figure, and only its opening 52, the absorption chamber 54, an absorber 55, the insulating wall 56 of the receiver 50, and the outlet connection 57 are shown schematically.

The changing assembly 51 is designed as a disc structure rotatably mounted at its centre 58, said disc structure forming a holder for the windows 60, 61 and 62. In the embodiment shown, the windows 52, 60 to 62 are arranged separately along the circumference of the disc.

For example, if the disc structure is rotated in an anticlockwise direction, the window 52 covering the opening 53 is replaced by another window, in this case the window 62.

The result is a receiver with an absorber and an opening for the solar rays incident on the absorber during operation, with a window being provided which covers the opening, with a changing assembly to change the window covering the opening for another window. If, during operation of the receiver, the window structure or the holder for the window is rotated further in a predetermined cycle (due to soiling, temperature, ageing or defects of the window, etc.), the window 61 and then the window 60 are brought into the operating position on the opening 53, until finally the configuration shown in the figure is again present, in which the window 52 is arranged in the opening 53. This change of the window 52, 60 to 61 is performed in a predetermined fashion, as mentioned, but can also be triggered spontaneously in case of defects. This results in a receiver in which the changing assembly preferably has a number of windows and a holder for these, with the holder being configured to be movable relative to the receiver in such a way that, during operation, one window after the other covers the opening in a predetermined change.

The window 61 is located outside the opening 53 and in a maintenance station 65, in which, in the embodiment shown, nozzles 66 of a cleaning device are arranged, which spray a cleaning agent, which cleans the window 61. As the disc structure 59 progressively rotates, each of the windows 52, 60 to 62 is thus inserted at the receiver 50, then serviced in the maintenance assembly and finally reinserted at the receiver 50.

A receiver preferably comprising a maintenance assembly for another transparent window located outside the opening is thus provided, the maintenance assembly further preferably comprising a cleaning device for a window located outside the opening.

In the figure, the maintenance assembly 65 is shown cleaning the window on the inner side thereof, facing the receiver 50. In an embodiment not shown, cleaning is also provided on the outer side of the window.

Figure 3:
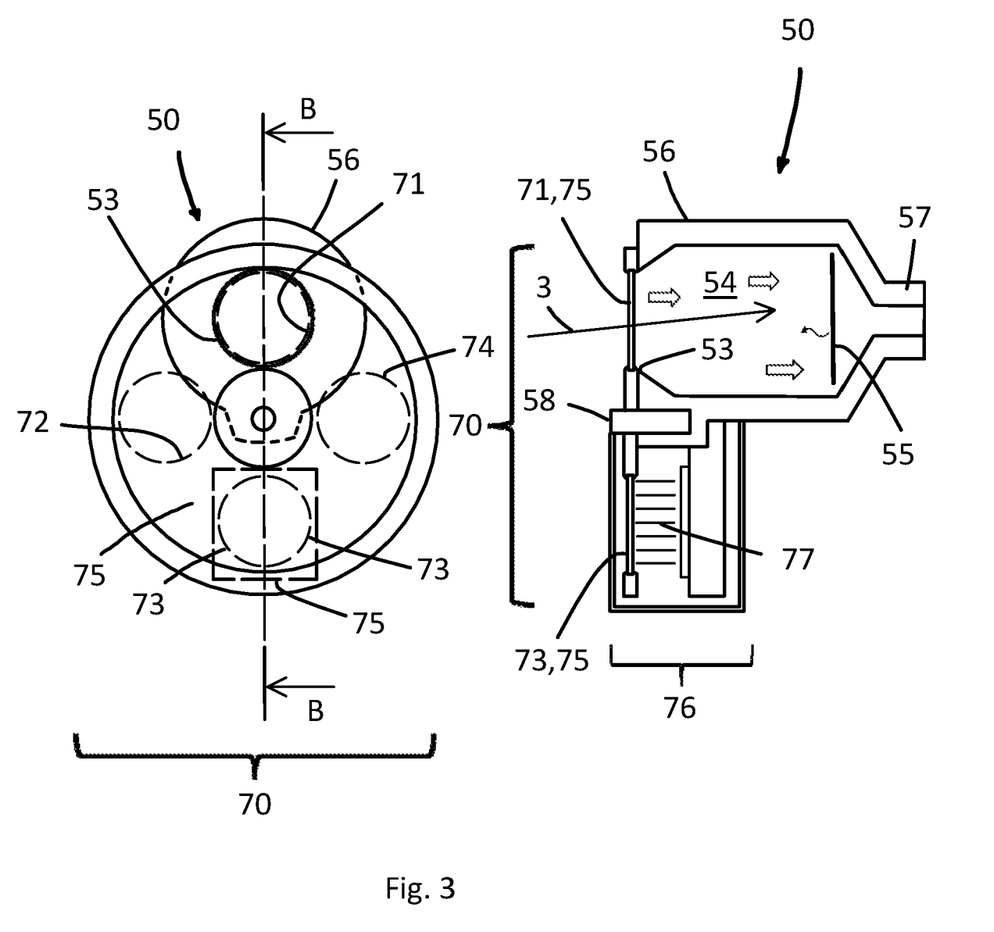
FIG. 3 shows a second embodiment of a window assembly according to the invention.

FIG. 3 shows a further embodiment of the receiver 50 with a changing device 70. Again, the left side of the figure shows a view of the side of the opening 53 of the receiver 50 illuminated by the sun and the right side shows a section corresponding to the plane PB.

In contrast to FIG. 3, the individual windows 52, 60 to 62 of FIG. 2 are formed here as regions 11 to 74 of a single transparent annular window 75. Such regions are also referred to as "windows" here, since these regions are brought over the opening 53 of the receiver 50 and represent an operable window there for the receiver. Thus, the transparent annular window 75 can be rotated in steps, corresponding to an operation according to FIG. 2, or continuously, so that a window or region 71 to 74 of the annular window 71 corresponding to a window 52, 60 to 62 (FIG. 2) passes continuously over the opening 53 of the receiver. A person skilled in the art can (as with all exemplary embodiments according to the invention) suitably determine the arrangement of the windows or regions in the annular window and the mode of movement thereof in the specific case.

This results in a receiver in which the changing assembly is preferably designed as a disc structure which can be rotated about its centre and forms a holder for the windows, in which disc structure the windows are formed as regions of a single transparent ring (or ring portion).

The maintenance station 75 is shown here schematically with a cooling device for the region 73, with a curtain 76 of cooling fluid being shown schematically. However, as in all embodiments according to the invention with a maintenance station, the maintenance station 75 can be formed in the specific case by a person skilled in the art with suitable means for the maintenance of a window or window region (cooling, cleaning, etc.).

Figure 4:
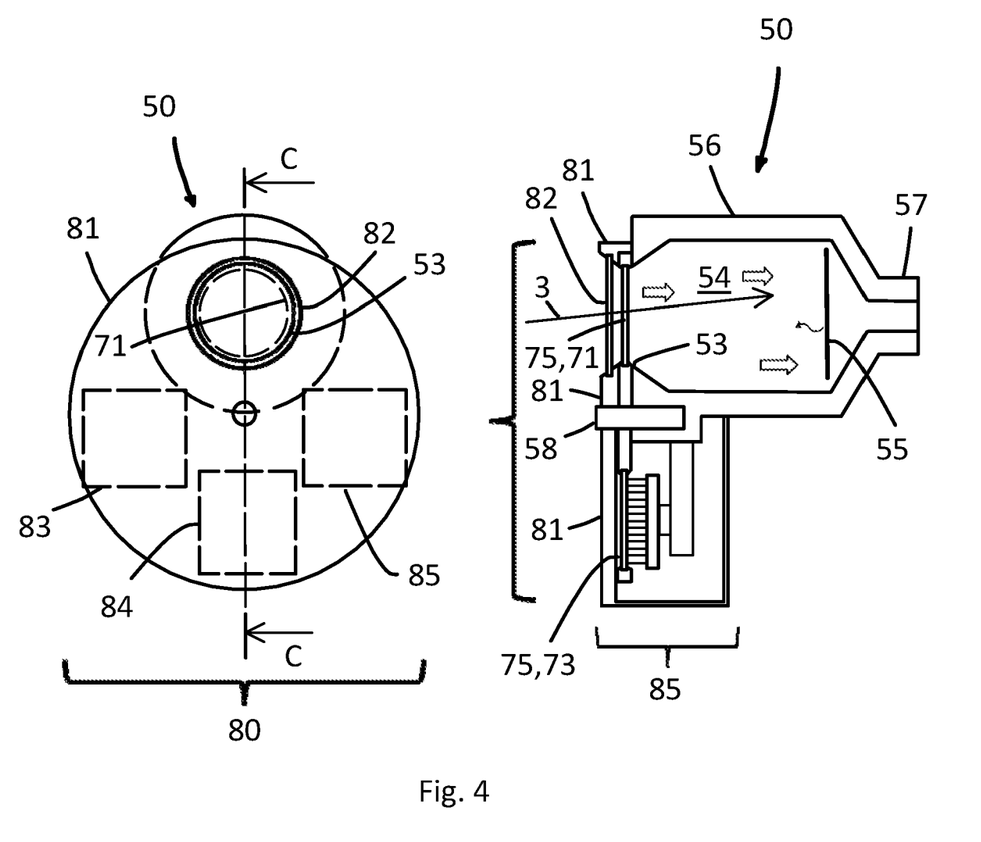
FIG. 4 shows a third embodiment of a window assembly according to the invention.

FIG. 4 shows another embodiment of the receiver 50 with a changing device 80. Again, the left side of the figure shows a view of the side of the opening 53 of the receiver 50 illuminated by the sun and the right side shows a section corresponding to the plane CC.

The changing station 80 is provided with an outer cover 81, which, in the embodiment shown, covers the disc structure with the annular window 71 (FIG. 3) and preferably seals it off from the outside world in a gas-tight manner. The cover 81 has an outer window 82, which is located over the opening 53 of the receiver 50. Since FIG. 3 shows an embodiment with an annular window 71, a window region 11 is also visible at the location of the outer window 82. The cover 81 with the outer window 82 can, for example, create a gas-tight space in the changing station 80, at least in the region of the opening 53 of the receiver 50, which is advantageous when the heat-transporting fluid of the receiver 30 circulates under pressure during operation. Likewise, the outer side here of the annular window 71 can be kept free of dust or other deposits from the environment.

The result is a receiver in which the changing assembly between the window covering the opening and the outside world has a further outer window which extends over the opening and which is preferably fixed to the receiver in a gas-tight manner.

In the case of an embodiment of the invention with an outer cover 81, the changing assembly may of course have windows 52, 60 to 62 (FIG. 2) or another configuration of windows not shown in the figures, instead of the annular window 71.

FIG. 4 also shows three maintenance stations 83 to 85 by way of dashed lines, here each for a different function, for example maintenance station 83 for cooling, and maintenance stations 84 and 85 for two cleaning or preparation steps for the windows or window regions 71 to 74.

Figure 5:
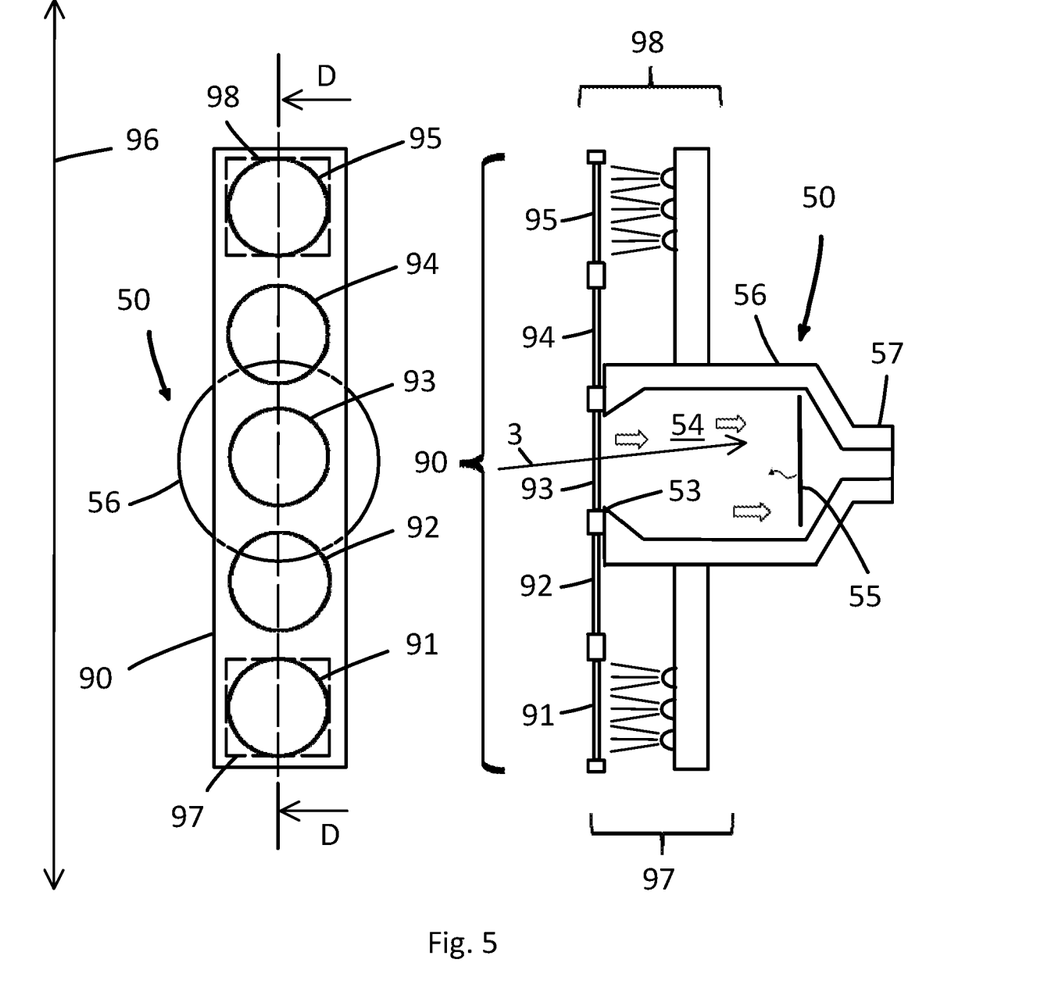
FIG. 5 shows a third embodiment of a window assembly according to the invention.

FIG. 5 shows a further embodiment of the receiver 50 with a changing device 90. Again, the left side of the figure shows a view of the side of the opening 53 of the receiver 50 illuminated by the sun and the right side shows a portion corresponding to the plane DD.

In contrast to the embodiments shown in FIGS. 2 to 4, the changing assembly is designed as a strip-shaped holder 90 for windows 91 to 95 arranged separately therein. The strip-shaped holder 90 can be displaced according to the double arrow 96 so that all windows 91 to 95 can be brought to the location of the opening 53 of the receiver 50. Analogously to the annular window 71 according to FIG. 3, an elongate window can also be provided here, which extends over the length between the windows 91 and 95. Instead of a single elongate window, it is also possible to provide two windows half as long.

Maintenance stations 97, 98 are then provided and formed on both sides of the receiver 50, as described above with reference to FIGS. 2 to 4. The strip-shaped holder 90 can be provided with an outer cover and then with an outer window at the location of the opening 53 of the receiver 50, analogously to the design of the changing assembly 80 according to FIG. 4. Likewise, a person skilled in the art can determine the number of individual windows or the length of one elongate window as required in the specific case.

In an embodiment not shown in the figures, a blind, for example thermally insulating window 52, 60 to 62, 91 to 95 or window region 71 to 84 is provided to protect the receiver 50 from cooling in the event of cloud cover or overnight when productive operation has to be interrupted. Additionally or alternatively, this window may also be reflective to the interior of the receiver 50 for light (which includes both visible light and IR radiation due to the high temperatures within the receiver 50). A thermally insulating window primarily has a low thermal conductivity, since absorbed radiation from the inside of the receiver 50 heats up its inner side, however, this heat should reach its outer side as slowly as possible, where it is then emitted to the outside world and thus cools down the receiver 50. This then results in a receiver in which the changing assembly preferably has a thermally insulating window and/or a window that reflects light towards the inside of the receiver, or a non-transparent window region.

In a further embodiment not shown in the figures, another window 52, 60 to 62, 71 to 74, 75 is formed as an opening or hole in the changing assembly, so that the absorption chamber 54 is then directly connected to the outside world. This is advantageous because in principle each window covering the opening 25 to the absorption chamber 15, 54 absorbs the incident radiation itself to a small degree, which is undesirable but is accepted because without windows environmental influences such as wind etc. might disturb the flow conditions in the receiver 50 and thus reduce its efficiency. Conversely, it can thus be advantageous not to provide a window, for example, when there is no wind, so that the opening 25 to the absorption chamber remains free and the solar radiation 3 reaches the absorption chamber 15, 54 directly without passing through a material that is transparent to it (but still unavoidably somewhat absorbent). In the case of such an embodiment, for example, instead of one of the windows 91 to 95 according to FIG. 5 or one of the windows 60 to 62 according to FIG. 2, an opening or hole can be formed. Furthermore, an opening corresponding to the opening 53 of the receiver 50 can then be provided, for example, in a transparent annular window 75 according to FIG. 3, which, as a hole in the annular window 15, allows a direct connection of the absorption chamber 15, 54 to the outside world. This preferably results in a receiver 50 in which the changing assembly has a window in the form of a hole for the opening 52 of the receiver 50.

In a further embodiment, the rotation or the translatory movement of the holder of the windows or window regions is controlled in such a way that a window once known to be defective no longer passes over the opening 53 of the receiver 50, so that the operation of the receiver 50 can be maintained despite a defective window (or window region, for example on an annular window 71).

In a further embodiment not shown in the figures, the changing assembly is operatively connected to a separately arranged maintenance station, so that only the window at the opening 53 is replaced in the changing assembly, and the maintenance or replacement of windows takes place in the separate maintenance station.

Lastly, in accordance with the invention, a solar power plant with a receiver having a changing assembly to change the window covering the opening of the receiver for another window is provided. Preferably, the solar power plant then has a maintenance station which is separate from he changing assembly and which is further preferably provided with a magazine for windows.

Furthermore, in accordance with the invention, a method for the maintenance of a window designed for the incidence of solar radiation into a receiver is provide, wherein, during operation of the receiver, a window requiring maintenance is replaced by a changing assembly interacting with the receiver for another window not requiring maintenance. Preferably, the maintenance is then carried out in a maintenance station provided for this purpose in the changing assembly.

The invention claimed is:

1. A receiver having an absorber and an opening for solar rays incident on the absorber during operation, a window being provided, which covers the opening, characterised by a changing assembly interacting with said window to change the window covering the opening for another window, wherein the receiver is designed as an absorptive receiver, and wherein a ratio X of a temperature increase of a heat-transporting fluid in the receiver due to absorption of radiation to a total temperature increase due to absorption and convection at the absorber is ≥0.3.

2. The receiver according to claim 1, wherein the changing assembly has a number of windows and a holder for these, wherein the holder is configured to be movable relative to the receiver in such a way that, in operation, one window after the other covers the opening in a predetermined change.

3. The receiver according to claim 2, wherein the changing assembly is designed as a disc structure which is rotatable about its centre, forms the holder for the windows, and in which the windows are arranged individually distributed along a circumference of the disc.

4. The receiver according to claim 2, wherein the changing assembly is designed as a disc structure which is rotatable about its centre, forms the holder for the windows, and in which the windows are formed as regions of a single transparent ring.

5. The receiver according to claim 1, wherein the changing assembly is designed as a strip-shaped holder for windows arranged individually therein one behind the other or an elongate window.

6. The receiver according to claim 1, wherein it has a maintenance assembly for another transparent window located outside the opening.

7. The receiver according to claim 6, wherein the maintenance assembly has a cooling device for a window located outside the opening.

8. The receiver according to claim 6, wherein the maintenance assembly has a cleaning device for a window located outside the opening.

9. The receiver according to claim 1, wherein the changing assembly between the window covering the opening and the outside world has a further outer window, which extends over the opening.

10. The receiver according to claim 1, wherein the changing assembly comprises a thermally insulating window and/or a window that reflects light against the interior of the receiver.

11. The receiver according to claim 1, wherein the changing assembly has a window, formed as a hole, for the opening of the receiver.

12. The receiver according to claim 1, wherein the ratio X of the temperature increase of the heat-transporting fluid in the receiver due to absorption of radiation to the total temperature increase due to absorption and convection at the absorber is ≥0.6.

13. The receiver according to claim 1, wherein the receiver is formed as a receiver-reactor.

14. The receiver according to claim 13, wherein the receiver is configured for a redox reaction or for the cracking of hydrocarbon gases.

15. The receiver according to claim 1, wherein the changing assembly is designed as a disc structure which is rotatable about its centre, forms a holder for the windows, and in which the windows are arranged individually distributed along the circumference of the disc.

16. The receiver according to claim 1, wherein the changing assembly is designed as a disc structure which is rotatable about its centre, forms a holder for the windows, and in which the windows are formed as regions of a single transparent ring.

17. The receiver according to claim 1, wherein the ratio X of the temperature increase of the heat-transporting fluid in the receiver due to absorption of radiation to the total temperature increase due to absorption and convection at the absorber is ≥0.8.

18. The receiver according to claim 9, wherein the further outer window is fixed to the receiver in a gas-tight manner.

19. A solar power plant comprising a receiver, characterised in that the plant has a changing assembly to change a window covering an opening of the receiver for another window, wherein the receiver is designed as an absorptive receiver and wherein a ratio X of a temperature increase of a heat-transporting fluid in the receiver due to absorption of radiation to a total temperature increase due to absorption and convection at the absorber is ≥0.3.

20. The solar power plant according to claim 19, wherein the ratio X of the temperature increase of the heat-transporting fluid in the receiver due to absorption of radiation to the total temperature increase due to absorption and convection at the absorber is ≥0.6.

21. The solar power plant according to claim 19, wherein the ratio X of the temperature increase of the heat-transporting fluid in the receiver due to absorption of radiation to the total temperature increase due to absorption and convection at the absorber is ≥0.8.

22. A method for maintaining a window designed for incidence of solar radiation into a receiver, characterised in that a window requiring maintenance, during operation of the receiver, is replaced by a changing assembly interacting with the receiver for another window not requiring maintenance, wherein the receiver is designed as an absorptive receiver, and wherein a ratio X of a temperature increase of a heat-transporting fluid in the receiver due to absorption of radiation to a total temperature increase due to absorption and convection at the absorber is ≥0.3.

23. The method according to claim 22, wherein the maintenance is performed in a maintenance station provided for this purpose in the changing assembly.

24. The method according to claim 22, wherein the ratio X of the temperature increase of the heat-transporting fluid in the receiver due to absorption of radiation to the total temperature increase due to absorption and convection at the absorber is ≥0.6.

25. The method according to claim 22, wherein the ratio X of the temperature increase of the heat-transporting fluid in the receiver due to absorption of radiation to the total temperature increase due to absorption and convection at the absorber is ≥0.8.

* * * * *